June 9, 1931.  A. A. HEINZELMANN  1,809,123
VARIABLE SPEED TRANSMISSION
Original Filed July 19, 1929   5 Sheets-Sheet 1

INVENTOR
Alphonse A. Heinzelmann
BY
ATTORNEY

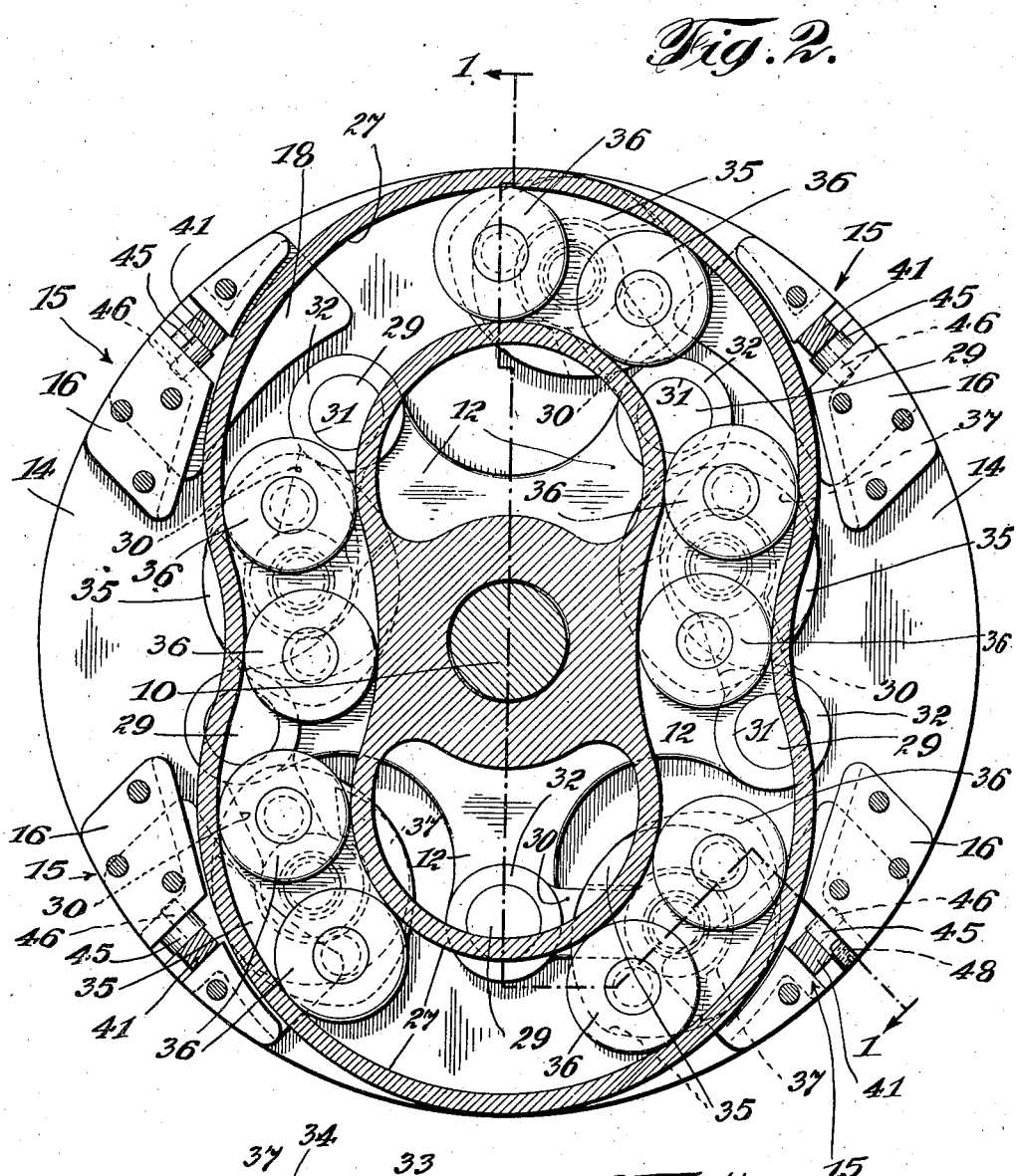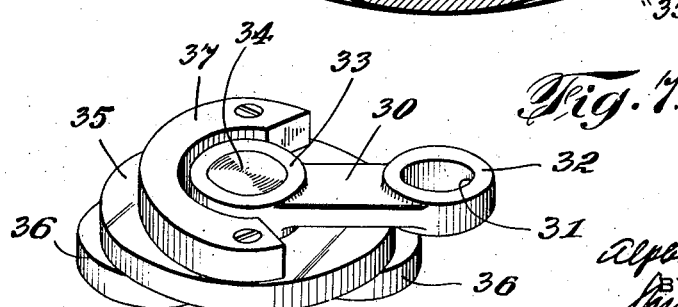

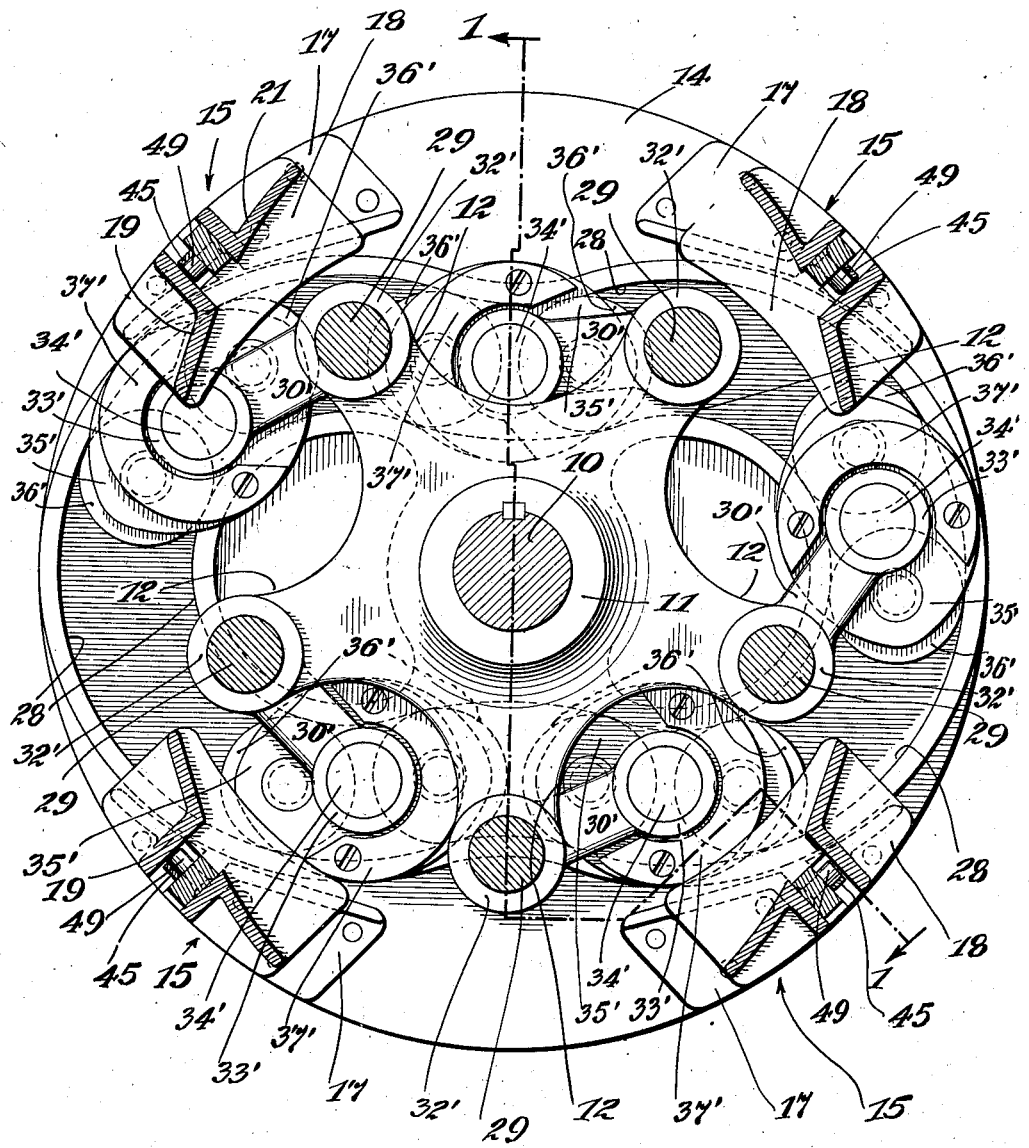

June 9, 1931.  A. A. HEINZELMANN  1,809,123
VARIABLE SPEED TRANSMISSION
Original Filed July 19, 1929  5 Sheets-Sheet 4

INVENTOR
Alphonse A. Heinzelmann
BY
his ATTORNEY

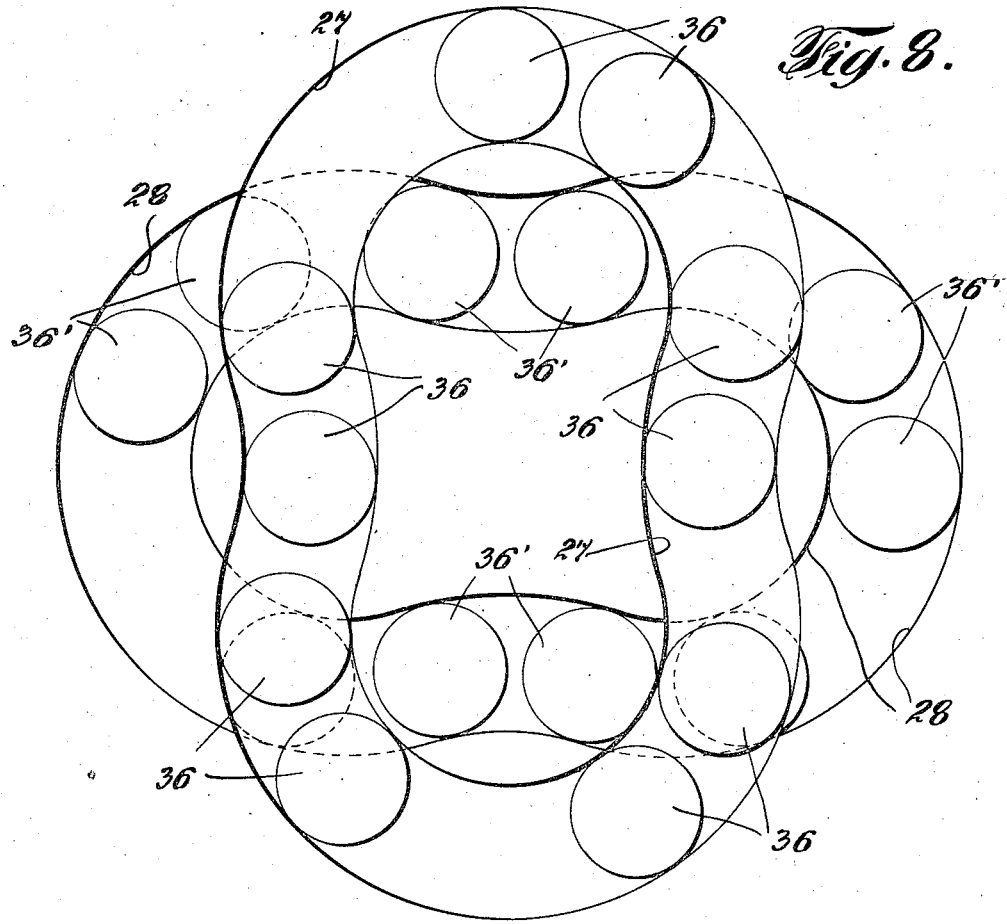
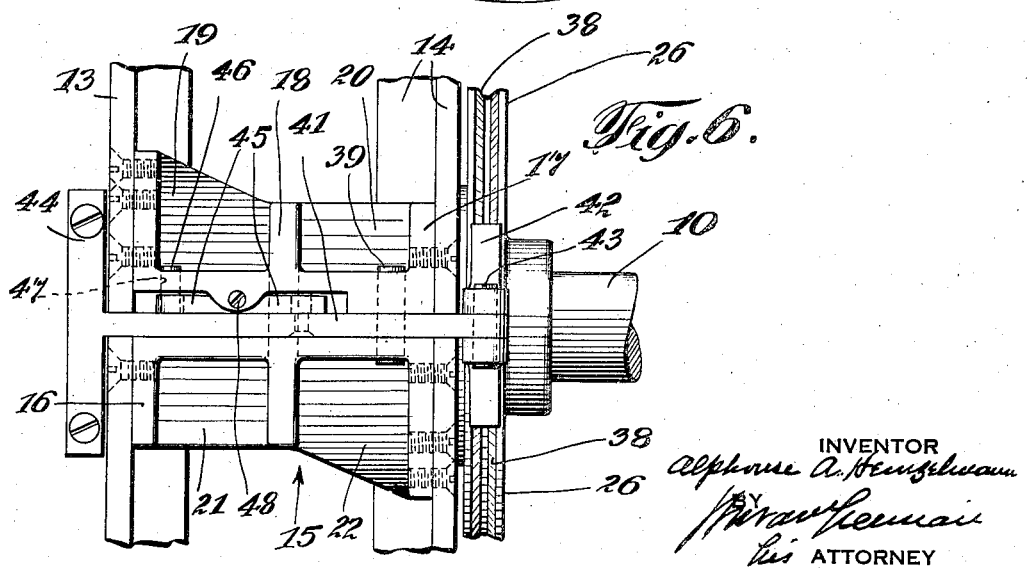

Patented June 9, 1931

1,809,123

UNITED STATES PATENT OFFICE

ALPHONSE A. HEINZELMANN, OF NEW YORK, N. Y., ASSIGNOR TO BLUDALK, INC., OF NEW YORK, N. Y., A CORPORATION OF NEW YORK

VARIABLE SPEED TRANSMISSION

Application filed July 19, 1929, Serial No. 379,425. Renewed May 2, 1931.

My invention relates to transmissions and refers particularly to variable speed transmissions.

One of the objects of my invention is a device in which the rotatable speed of a driven member may be governed and controlled by the rotatable speed of the driving member without the interposition or necessity of change-speed or gear-shift mechanism.

The many disadvantages of gear-shift transmissions are generally recognized and while numerous attempts have been made to devise transmissions eliminating the use of gear-shifts, none of them has been sufficiently efficient to meet with general practical adoption.

While transmissions are employed in many machines for the transmission of variable speeds, their principal application is found in automobiles, in which the constant changing of power requirements makes them a most important element of automobile machine construction.

Although the present employed automobile transmissions involving gear-shifts have considerable value for the transmission of variable power, they possess many disadvantages, particularly because their application is generally controlled by those unfamiliar with their operation, consequently, frequently resulting in serious injury to the mechanism, and a special disadvantage of such gear-shift transmissions is that a measurable period of time is required in order to shift from one gear to another, during which period the desired change of speed of the automobile is not accomplished; and as a rapid change of speed is frequently imperative in automobiles, such gear-shift transmissions are dangerous to safety.

It is evident, therefore, that a transmission, free from gear-shifts and having a constantly changing speed of the driven member dependent only upon the speed of the engine, would have high efficient and safety values over the gear-shift type of mechanism.

The device of my invention overcomes the above-mentioned and many other objectionable features of the gear-shift transmissions and presents a transmission in which the speed of the driven member is controlled entirely by the speed of the driving member.

The transmission of my invention comprises a device in which the revolution of the driving member produces a centrifugal force upon the driven member causing the latter to revolve and in which the centrifugal force increases with the increased speed of revolution of the driving member.

Further, it will be evident upon a consideration of my device, that as the increasing speed of the driving member increases the centrifugal force, the power of the driven member will increase.

I thus present a transmission, free from gear-shifts, and in which the power and speed of the driven member are controlled by the speed of the driving member, thus overcoming the dangers and difficulties incident to transmissions involving the use of gear-shifts.

Another feature of my invention is automatic means whereby the indirect drive between the driving member and the driven member, through the medium of their connection by means of the centrifugal members of my device, may be converted into a direct drive between the driving member and the driven member when the revolution of the driven member has reached a predetermined speed.

By means of this feature of my device, the driven member is revolved by means of the centrifugal members carried by the driving member until a predetermined speed is attained, at which time the driven member is automatically and gradually locked to the driving member, thus causing a direct drive of the driven member, when the speed of revolution of the driving member is reduced to the predetermined point, the element locking the driving member to the driven member is gradually and automatically released, the centrifugal members then acting to produce an indirect drive.

The value of this change of drive is evident.

In the ordinary fixed direct drive a change of speed is accomplished by gear-shifting from the stationary condition to a predetermined speed of revolution.

In my device changes of speed from the stationary condition to the predetermined speed of revolution are accomplished without the necessity of gear-shifts and when the predetermined speed of revolution is reached my device has all of the advantages of a fixed direct drive.

The advantages of a direct drive over an indirect centrifugal drive at high speeds for heavy loads is evident and the device of my invention possesses this valuable attribute connected with its valuable feature of the elimination of gear-shifts at all speeds.

The above mentioned and other valuable properties of my device will be evident upon a consideration of my specification and its accompanying drawings.

In the accompanying drawings illustrating one form of my device similar parts are designated by similar numerals.

Figure 2 is a section through the line 2—2 of Figure 1.

Figure 3 is a section through the line 3—3 of Figure 1.

Figure 6 is a bottom view of Figure 1.

Figure 7 is a perspective view of one of the centrifugal members.

Figure 8 is a plan view of the cam runways and the centrifugal drive rollers.

Figure 1:
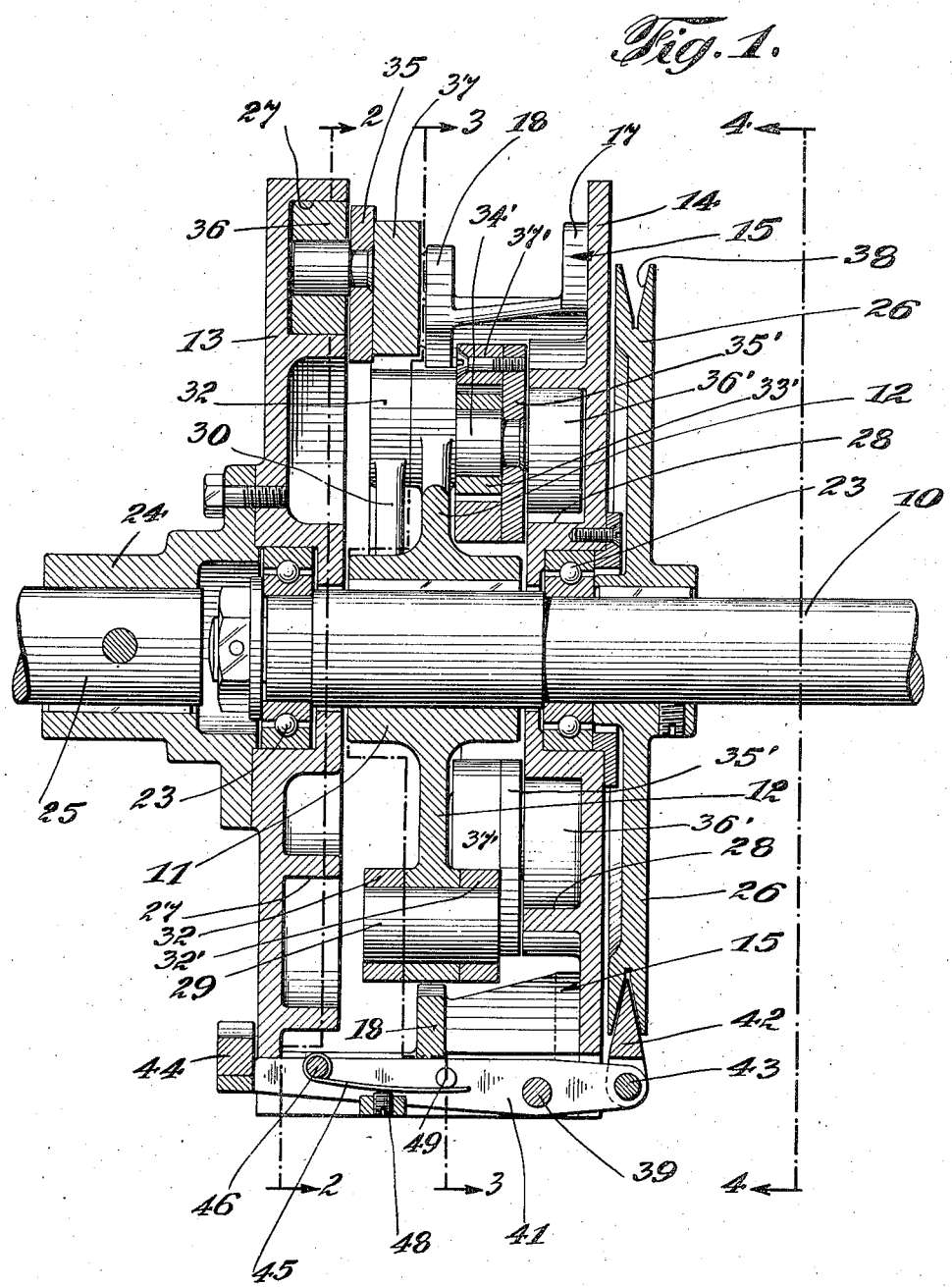
Figure 1 is a vertical section of one form of my device through the line 1—1 of Figure 2.
Figure 4:
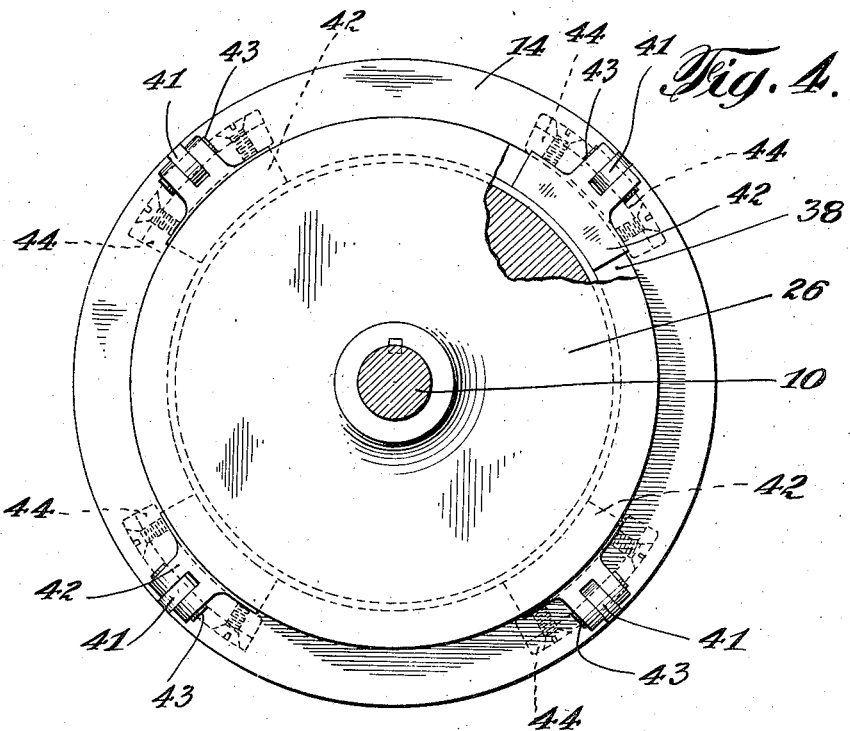
Figure 4 is a view along the line 4—4 of Figure 1.
Figure 5:
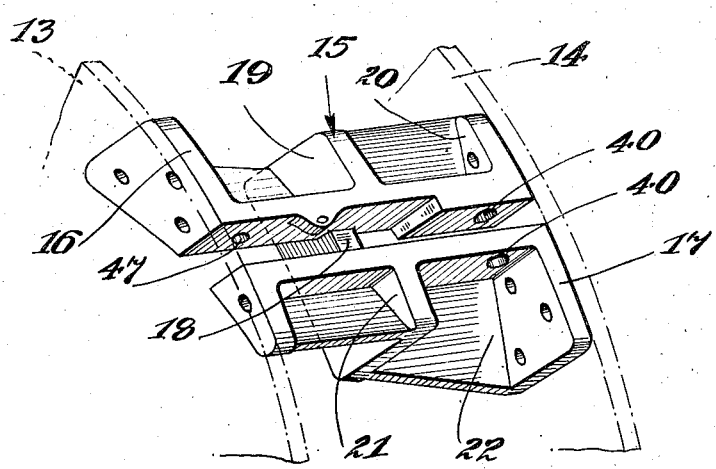
Figure 5 is a perspective view of one of the braces.

The particular form of the device of my invention illustrated in the accompanying drawings, comprises a revoluble drive shaft 10, to which a spider 11 having a plurality of legs 12, 12 is fixedly attached, five legs being shown in the particularly described form of my device.

Revoluble upon the drive shaft 10 is a driven casing comprising the sides 13 and 14, which are fixed to each other in spaced position by means of the connecting braces 15, 15.

These connecting braces consider of two members 16 and 17, spaced and connected together by the element 18. The brace member 16 has the recesses 19 and 20 and the brace member 17 has the recesses 21 and 22.

The driven casing is revoluble upon the ball bearings 23, 23.

Fixedly attached to the side 13 of the driven casing is a sleeve 24 fixedly attached to the driven shaft 25.

Fixedly attached to the drive shaft 10 is a direct drive disk 26, the operation of which will be described later.

Within the inner face of the driven casing side 13 is a cam runway 27 and within the inner face of the driven casing side 14 is a cam runway 28, the longitudinal axes of the two runways being at right angles to each other.

Extending through and beyond an annular opening in each leg 12 of the spider 11 is a cylindrical pin 29.

Pivotally carried by each pin 29 is a centrifugal member comprising the link 30, one end of which has the opening 31, into which the pin 29 enters, and the surrounding boss 32. The other end portion of the link 30 has an opening surrounded by a boss 33 within which is the revoluble pin 34. Fixedly attached to the pin 34 is an annular member 35 to which is attached the member 37, the latter being for the purpose of greater centrifugal throw during the operation of the device. Pivotally attached to the outer face of the annular member 35 are two drive rollers 36, 36, which rollers move within the cam runway 27 and are capable of abutment upon the sides thereof.

As each side of the pivot 29 carries a centrifugal member and as there are five such pins, the illustrated device contains ten centrifugal members, the rollers of five being movable within the cam runway 27 and the opposite five being movable within the cam runway 28. The elements of the other centrifugal members are shown by prime numerals.

Fixedly attached to the drive shaft 10 is the annular plate 26 having an angular recess 38 in its outer periphery.

Pivotally attached to each brace by means of a pin 39 passing through the holes 40, 40 of said brace is an arm 41. A wedge-shaped locking-member, or slide, 42, is pivotally attached to each arm 41 by means of the pivot 43, the locking-member 42 being capable of abutment against the sides of the angular recess 38 of the plate 26. The other end of the arm 41 carries a removable weight 44. A spring 45, carried by the pin 46 passing through opening 47 of the brace, abuts upon the screw 48, threaded through an opening in the brace, and the pin 49, carried by the arm 41.

The operation of the device is as follows:—

The revolution of the drive shaft 10 revolves the spider 11 and the plurality of legs 12, 12. This revolution carries the plurality of centrifugal members, which being revolubly pivoted to the legs and each having a pair of pivotally attached revoluble rollers 36, 36, causes the said rollers to move within the cam runways 27 and 28, the abutment of the rollers against the sides of the runways causing a revolution of the casings 13 and 14 and a revolution of the driven shaft 25.

The following is the method by which the drive may be automatically changed from an indirect drive to a direct drive.

It is evident that where the revolution of the casing is such that the momentum will not cause the weights 44, 44, to move outwardly, the shoes 42, 42 will not be in abutment with the sides of the recesses 38, 38 of the members 26, and hence the revolution of the drive shaft 10 will be transmitted to the driven shaft 25 by means of the abutments of the centrifugal members against the sides of the runways 27 and 28.

When, however, the centrifugal momentum is sufficient, the weights 44, 44 will be thrown gradually outwardly, thus causing the arms 41, 41 to move upon the pins 39, 39 and forcing the shoes, or locking members 42, 42 into the recess 38 of the member 26.

The drive shaft 10 is thus locked, or fixedly attached, to the casing by means of the member 26 fixedly attached to the shaft 10 and hence the driven shaft 25 is directly driven by the drive shaft 10.

The amount of momentum of the casing necessary to cause a direct drive action may be governed by the weight of the weight 44 and the movement of the screw 48 against the spring 45.

It will thus be seen that the driven shaft 25 will be revolved indirectly through the medium of the centrifugal members until a predetermined speed is obtained, a further increase of speed gradually converting the indirect drive into a direct drive through the medium of the member 26 and the arms 41, 41.

It will be noted that the line of direction of the centrifugal force is not at right angles to the axial line of the drive shaft but is always directed forwardly of the arc of revolution, thus transmitting forwardly centrifugal force to the driven member.

Further, the constantly changing line of direction of centrifugal force with respect to the axial line of the drive shaft overcomes the objection to a fixed line of direction of centrifugal force with respect to the axial line of the drive shaft, in which latter case there are positions during the revolution when the line of direction of centrifugal force is opposed to driving the driven member, as for instance at the top and bottom portions of the cam-way.

Further while the legs 12, 12 of the spider 11 revolve in a circular movement around the drive shaft 10, the relative positions of the rollers 36, 36 thereto are constantly changing, and as these two rollers 36, 36 are in fixed position with respect to each other upon the member 35, and as the line of direction of centrifugal force of these two rollers do not coincide, their lines of centrifugal forces are not identical. Because of the above conditions, the resultant of the lines of force of the two rollers varies inwardly and outwardly against the respective inner and outer walls of the cam-runway, causing a constant forwardly directed centrifugal force upon either the inner or the outer wall, or both, thus producing a constant revolving force upon the driven member.

While, I may use a driven member having but one cam-runway end and one series of centrifugal members, I prefer to use the double set as shown, as they not only balance the device, but by positioning the cam-runways in angular position with respect to each other, I produce a device in which I have, at any moment, twice the number of lines of force direction, thus causing a better balanced and more effective device.

While I may employ an even number of centrifugal members in each series, I prefer to employ an odd number in order that no two centrifugal-members in any one series will at any time have the same angular position with respect to the direction of revolution of the driven member.

While I prefer to employ two offset centrifugal rollers, as shown, any suitable number of such rollers may be used or they may be entirely dispensed with. In my specification and drawings, I refer to the centrifugal-member carrying member as the drive member and the cam runway member as the driven member, but it is evident that these terms may be reversed if the cam runway member is used as the drive member, and hence, in my specification and claims I use the terms interchangeably.

I do not limit myself to the particular size, shape, number or arrangement of parts as shown and described, as these are given simply as a means for clearly describing my invention.

What I claim is:

1. In a variable speed transmission, in combination, a revoluble driven member having a cam runway, a revoluble drive shaft, a spider having a plurality of legs fixedly attached to said shaft, a link pivotally attached to the end portion of each said leg, a roller-carrying member pivotally attached to the free end of each said link and a plurality of rollers pivotally attached to each said roller-carrying member positioned within said runway and capable of abutment upon the sides thereof whereby the revolution of said shaft will revolve said driven member.

2. In a variable speed transmission, in combination, a revoluble driven member having a non-circular cam runway, a revoluble drive shaft, a spider having a plurality of legs fixedly attached to said shaft, a link pivotally attached to the end portion of each said leg, a roller-carrying member pivotally attached to the free end of each said link and a plurality of rollers pivotally attached to each said roller-carrying member positioned within said runway and capable of abutment upon the sides thereof whereby the revolution of said shaft will revolve said driven member.

3. In a variable speed transmission, in combination, a revoluble driven member having a cam runway, a revoluble drive shaft, a spider having a plurality of legs fixedly attached to said shaft, a link pivotally attached to the end portion of each leg, a non-slidable roller-carrying member pivotally attached to the free end of each said link, and a plurality of rollers pivotally attached to each said roller-carrying member positioned within said runway and capable of abutment upon the sides thereof whereby the revolution of said shaft will revolve said driven member.

4. In a variable speed transmission, in combination, a revoluble driven member having a non-circular cam runway, a revoluble drive shaft, a spider having a plurality of legs fixedly attached to said shaft, a link pivotally attached to the end portion of each said leg, a non-slidable roller-carrying member pivotally attached to the free end of each said link, and a plurality of rollers pivotally attached to each said roller-carrying member positioned within said runway and capable of abutment upon the sides thereof whereby the revolution of said shaft will revolve said driven member.

5. In a variable speed transmission, in combination, a revoluble driven member having a cam runway having parallel corresponding side walls, a revoluble drive shaft, a spider having a plurality of legs fixedly attached to said shaft, a link pivotally attached to the end portion of each said leg, a roller-carrying member pivotally attached to the free end of each said link and a plurality of rollers pivotally attached to each said roller-carrying member positioned within said runway and capable of abutment upon the sides thereof whereby the revolution of said shaft will revolve said driven member.

6. In a variable speed transmission, in combination, a revoluble driven member having a cam runway having parallel corresponding side walls, a revoluble drive shaft, a spider having a plurality of legs fixedly attached to said shaft, a link pivotally attached to the end portion of each said leg, a non-slidable roller-carrying member pivotally attached to the free end of each said link, and a plurality of rollers pivotally attached to each said roller-carrying member positioned within said runway and capable of abutment upon the sides thereof whereby the revolution of said shaft will revolve said driven member.

7. In a variable speed transmission, in combination, a revoluble driven member having two ends, each end having a cam runway in its inner face; a revoluble drive shaft; a spider having a plurality of legs fixedly attached to said shaft; two links pivotally attached to the end portion of each said leg; a roller-carrying member pivotally attached to the free end of each said link and a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member.

8. In a variable speed transmission, in combination, a revoluble driven member having two ends, each end having a cam runway in its inner face; a revoluble drive shaft positioned between said driven member ends, a spider having a plurality of legs positioned between said driven member ends and fixedly attached to said shaft; two links pivotally attached to the end portion of each said leg; a roller-carrying member pivotally attached to the free end of each said link and a plurality of rollers pivotally attached to each said roller carrying member, one series of said rollers being positioned within said runway and capable of abutment upon the sides thereof and the other series of said rollers being positioned witihn the other said runway and capable of abutment upon the sides thereof, so positioned that the revolution of said drive shaft will revolve said driven member.

9. In a variable speed transmission, in combination, a revoluble driven member having two ends, each end having a cam runway having parallel corresponding side walls in its inner face; a revoluble drive shaft; a spider having a plurality of legs fixedly attached to said shaft; two links pivotally attached to the end portion of each said leg; a roller-carrying member pivotally attached to the free end of each said link and a plurality of rollers pivotally attached to each other said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member.

10. In a variable speed transmission, in combination, a revoluble driven member having two ends, each end having a cam runway having parallel corresponding side walls in its inner face; a revoluble drive shaft, positioned between said driven member ends; a spider having a plurality of legs, positioned between said driven member ends and fixedly attached to said shaft; two links pivotally attached to the end portion of each said leg; a roller-carrying member pivotally attached to the free end of each said link and a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member.

11. In a variable speed transmission, in combination, a revoluble driven member having a cam runway, a revoluble drive shaft, a spider having a plurality of legs fixedly attached to said shaft, a link pivotally attached to the end portion of each said leg, a roller-carrying member pivotally attached to the free end of each said link, a plurality of rollers pivotally attached to each said roller-carrying member positioned within said runway and capable of abutment upon the sides thereof whereby the revolution of said shaft will revolve said driven member and means whereby the revolution of said driven member at a predetermined speed will automatically lock said driven member to said shaft.

12. In a variable speed transmission, in combination, a revoluble driven member having a cam runway having parallel corresponding side walls, a revoluble drive shaft, a spider having a plurality of legs fixedly attached to said shaft, a link pivotally attached to the end portion of each said leg, a roller-carrying member pivotally attached to the free end of each said link, a plurality of rollers pivotally attached to each said roller-carrying member positioned within said runway and capable of abutment upon the sides thereof whereby the revolution of said shaft will revolve said driven member and means whereby the revolution of said driven member at a predetermined speed will automatically lock said driven member to said shaft.

13. In a variable speed transmission, in combination, a revoluble driven member having two ends, each end having a cam runway in its inner face; a revoluble drive shaft; a spider having a plurality of legs fixedly attached to said shaft; two links pivotally attached to the end portion of each said leg; a roller-carrying member pivotally attached to the free end of each said link; a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member and means whereby the revolution of said driven member at a predetermined speed will automatically lock said driven member to said shaft.

14. In a variable speed transmission, in combination, a revoluble driven member having two ends, each end having a cam runway having parallel corresponding side walls in its inner face; a revoluble drive shaft; a spider having a plurality of legs fixedly attached to said shaft; two links pivotally attached to the end portion of each said leg; a roller-carrying member pivotally attached to the free end of each said link; a plurality of rollers pivotally attached to each said roller carrying member, one series of said rollers being positioned within said runway and capable of abutment upon the sides thereof and the other series of said roller being positioned within the other said runway and capable of abutment upon the sides thereof, so positioned that the revolution of said drive shaft will revolve said driven member and means whereby the revolution of said driven member at a predetermined speed will automatically lock said driven member to said shaft.

15. In a variable speed transmission, in combination, a revoluble driven member having two ends, each end having a cam runway in its inner face; a revoluble drive shaft positioned between said driven member ends; a spider having a plurality of legs positioned between said driven member ends and fixedly attached to said shaft; two links pivotally attached to the end portion of each said leg; a roller-carrying member pivotally attached to the free-end of each said link; a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member and means whereby the revolution of said driven member at a predetermined speed will automatically lock said driven member to said shaft.

16. In a variable speed transmission, in combination, a revoluble driven member having two ends, each end having a cam runway having parallel corresponding side walls in its inner face; a revoluble drive shaft positioned between said driven member ends; a spider having a plurality of legs positioned between said driven member ends and fixedly attached to said shaft; two links pivotally attached to the end portion of each said leg; a roller-carrying member pivotally attached to the free end of each said link; a plurality of rollers pivotally attached to each said roller-carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member and means whereby the revolution of said driven member at a predetermined speed will automatically lock said driven member to said shaft.

17. In a variable speed transmission, in combination, a revoluble driven member having a cam runway, a revoluble drive shaft, a spider having a plurality of legs fixedly attached to said shaft, a link pivotally attached to the end portion of each said leg, a roller-carrying member pivotally attached to the free end of each said link, a plurality of rollers pivotally attached to each said roller-carrying member positioned within said runway and capable of abutment upon the sides thereof whereby the revolution of said shaft will revolve said driven member, an annular locking member fixedly attached to said shaft; a centrifugally movable member carried by said driven member, and means whereby the rotary movement of said driven member will cause said centrifugally movable member to engage with, and disengage from, said annular member causing the driven member to be locked to, and unlocked from, said shaft.

18. In a variable speed transmission, in combination, a revoluble driven member having a cam runway, having parallel corresponding side walls, a revoluble drive shaft, a spider having a plurality of legs fixedly attached to said shaft, a link pivotally attached to the end portion of each said leg, a roller-carrying member pivotally attached to the free end of each said link, a plurality of rollers pivotally attached to each said roller-carrying member positioned within said runway and capable of abutment upon the sides thereof whereby the revolution of said shaft will revolve said driven member, an annular locking member fixedly attached to said shaft; a centrifugally movable member carried by said driven member, and means whereby the rotary movement of said driven member will cause said centrifugally movable member to engage with, and disengage from, said annular member causing the driven member to be locked to, and unlocked from, said shaft.

19. In a variable speed transmission, in combination, a revoluble driven member having two ends, each end having a cam runway in its inner face; a revoluble drive shaft; a spider having a plurality of legs fixedly attached to said shaft; two links pivotally attached to the end portion of each said leg; a roller carrying member pivotally attached to the free end of each said link; a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member, an annular locking member fixedly attached to said shaft; a centrifugally movable member carried by said driven member, and means whereby the rotary movement of said driven member will cause said centrifugally movable member to engage with, and disengage from said annular member causing the driven member to be locked to, and unlocked from, said shaft.

20. In a variable speed transmission, in combination, a revoluble driven member having two ends, each end having a cam runway having parallel corresponding side walls in its inner face; a revoluble drive shaft; a spider having a plurality of legs fixedly attached to said shaft; two links pivotally attached to the end portion of each said leg; a roller-carrying member pivotally attached to the free end of each said link; a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member, an annular locking member fixedly attached to said shaft; a centrifugally movable member carried by said driven member, and means whereby the rotary movement of said driven member will cause said centrifugally movable member to engage with, and disengage from, said annular member causing the driven member to be locked to, and unlocked from, said shaft.

21. In a variable speed transmission, in combination, a revoluble driven member having two ends, each end having a cam runway in its inner face; a revoluble drive shaft positioned between said driven member ends; a spider having a plurality of legs positioned between said driven member ends and fixedly attached to said shaft; two links pivotally attached to the end portion of each said leg; a roller-carrying member pivotally attached to the free end of each said link; a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member, an annular locking member fixedly attached to said shaft; a centrifugally movable member carried by said driven member; and means whereby the rotary movement of said driven member will cause said centrifugally movable member to engage with, and disengage from, said annular member causing the driven member to be locked to, and unlocked from said shaft.

22. In a variable speed transmission, in combination, a revoluble driven member having a cam runway, a revoluble drive shaft, a spider having a plurality of legs fixedly attached to said shaft, a link pivotally attached to the end portion of each said leg, a roller carrying member pivotally attached to the free end of each said link, a plurality of rollers pivotally attached to each said roller-carrying member positioned within said runway and capable of abutment upon the sides thereof whereby the revolution of said shaft will revolve said driven member, an annular member having a recess within its periphery fixedly attached to said shaft, and a shoe carried by said driven member, the rotary movement of said driven member causing said shoe to engage with, and disengage from, the walls of said recess, causing the driven member to be locked to, and unlocked from, said shaft.

23. In a variable speed transmission, in combination, a revoluble driven member having a cam runway, having parallel corresponding side walls, a revoluble drive shaft, a spider having a plurality of legs fixedly attached to said shaft, a link pivotally attached to the end portion of each said leg, a roller-carrying member pivotally attached to the free end of each said link, a plurality of rollers pivotally attached to each said roller-carrying member positioned within said runway and capable of abutment upon the sides thereof whereby the revolution of said shaft will revolve said driven member, an annular member having a recess within its periphery fixedly attached to said shaft, and a shoe carried by said driven member, the rotary movement of said driven member causing said shoe to engage with, and disengage from, the walls of said recess, causing the driven member to be locked to, and unlocked from said shaft.

24. In a variable speed transmission, in combination, a revoluble driven member having two ends, each end having a cam runway in its inner face; a revoluble drive shaft; a spider having a plurality of legs fixedly attached to said shaft; two links pivotally attached to the end portion of each said leg; a roller-carrying member pivotally attached to the free end of each said link; a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member, an annular member having a recess within its periphery fixedly attached to said shaft, and a shoe carried by said driven member, the rotary movement of said driven member causing said shoe to engage with, and disengage from, the walls of said recess, causing the driven member to be locked to, and unlocked from, said shaft.

25. In a variable speed transmission, in combination, a revoluble driven member having two ends, each end having a cam runway having parallel corresponding side walls in its inner face; a revoluble drive shaft; a spider having a plurality of legs fixedly attached to said shaft; two links pivotally attached to the end portion of each said leg; a roller-carrying member pivotally attached to the free end of each said link; a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member, an annular member having a recess within its periphery fixedly attached to said shaft, and a shoe carried by said driven member, the rotary movement of said driven member causing said shoe to engage with, and disengage from, the walls of said recess, causing the driven member to be locked to, and unlocked from said shaft.

26. In a variable speed transmission, in combination, a revoluble driven member having two ends, each end having a cam runway in its inner face; a revoluble drive shaft positioned between said driven member ends; a spider having a plurality of legs positioned between said driven member ends and fixedly attached to said shaft; two links pivotally attached to the end portion of each said leg; a roller-carrying member pivotally attached to the free end of each said link; a plurality of rollers pivotally attached to each said roller carrying member, one series of said rollers being positioned within said runway and capable of abutment upon the sides thereof and the other series of said rollers being positioned within the other said runway and capable of abutment upon the sides thereof, so positioned that the revolution of said drive shaft will revolve said driven member, an annular member having a recess within its periphery fixedly attached to said shaft, and a shoe carried by said driven member, the rotary movement of said driven member causing said shoe to engage with, and disengage from, the walls of said recess, causing the driven member to be locked to, and unlocked from said shaft.

Signed at New York city in the county of New York and State of New York this 18th day of July, 1929.

ALPHONSE A. HEINZELMANN.